US008816834B2

(12) United States Patent
Yang

(10) Patent No.: US 8,816,834 B2
(45) Date of Patent: Aug. 26, 2014

(54) STEERING ANGLE SENSING DEVICE FOR VEHICLE WHEEL ALIGNMENT

(76) Inventor: Jen-Yung Yang, Taichung (TW)

( * ) Notice: Subject to any disclaimer, the term of this patent is extended or adjusted under 35 U.S.C. 154(b) by 294 days.

(21) Appl. No.: 13/316,439

(22) Filed: Dec. 9, 2011

(65) Prior Publication Data

US 2013/0147614 A1 Jun. 13, 2013

(51) Int. Cl.

*B60Q 1/00* (2006.01)
*G01C 15/00* (2006.01)
*G01B 5/00* (2006.01)
*G01B 11/26* (2006.01)
*H04N 7/18* (2006.01)

(52) U.S. Cl.

USPC ............ 340/425.5; 33/288; 33/286; 356/155; 356/139.09; 348/142

(58) Field of Classification Search

USPC .................. 340/425.5; 33/288, 286; 356/155, 356/139.09; 348/142

See application file for complete search history.

(56) References Cited

U.S. PATENT DOCUMENTS 4,236,315 A * 12/1980 Curchod et al. ........... 33/203.18
7,150,105 B1 * 12/2006 Battaglia et al. ........... 33/203.18
2001/0022655 A1 * 9/2001 Stieff ....................... 356/139.09
2008/0037012 A1 * 2/2008 Braghiroli ..................... 356/153
2008/0040068 A1 * 2/2008 Phillips ......................... 702/150
2009/0059213 A1 * 3/2009 Wesby ..................... 356/139.09

* cited by examiner

*Primary Examiner* — George Bugg
*Assistant Examiner* — Jack K Wang
(74) *Attorney, Agent, or Firm* — Guice Patents PLLC

(57) ABSTRACT

A steering angle sensing device for vehicle wheel alignment includes a swingable rocking arm. The rocking arm can be located in a predetermined position and slidably connected with a simple wheel alignment calibrator. When a wheel of the vehicle is steered, the wheel alignment calibrator affixed to the wheel is synchronously rotated along with the steering of the wheel. At this time, the rocking arm is driven to swing by a corresponding angle and the steering angle sensing device emits a human-perceivable signal to a calibration worker, whereby the calibration worker can real-time know the steering angle of the wheel for conveniently performing the wheel alignment process.

16 Claims, 10 Drawing Sheets

22 32 30 231 23 31 232 26 40 41 253 24 44 20 42 25 251 252 10 21 43

STEERING ANGLE SENSING DEVICE FOR VEHICLE WHEEL ALIGNMENT

BACKGROUND OF THE INVENTION

1. Field of the Invention

The present invention relates generally to a vehicle service technique, and more particularly to a steering angle sensing device for vehicle wheel alignment.

2. Description of the Related Art

Vehicles are major transportation tools in the modern society. Vehicles are widely used in various fields in everyday life. It is very important to people how to use safely vehicles. A vehicle has a chassis structure on which the wheels are mounted. The wheels must be positioned in their true operation positions to ensure safety in driving. Many unexpected factors such as rugged roads, pits and incorrect driving behaviors will all affect the relative position between the wheels and the chassis to cause deflection of the wheels in driving. Under such circumstance, the vehicle will bump, shake and lose its balance when running or cornering at a high speed. After a long period of run under a bumping and shaking state, the parts and tires of the vehicle will abnormally wear to shorten the lifetime of the tires and threaten the safety in driving.

Wheel alignment is an important part of vehicle service for restoring the wheels to their true positions. In general, in wheel alignment, the camber, K.P.I., toe, caster and toe-out on turn of the wheels are calibrated. FIG. 1 shows a conventional detection platform 1 for checking the angle of a wheel. The wheel of the vehicle to be checked is placed on the detection platform 1 and positioned on a turntable 2 for measuring the angle of the wheel. A considerably large room in a garage is needed for arrangement of the detection platform 1. This is unbeneficial to an ordinary garage.

U.S. patent Ser. No. 11/847,319 discloses an apparatus and a method for wheel alignment. In the apparatus, by means of a mounting fixture assembly, a laser device is mounted to the rims of the wheels of motor vehicles. The laser device emits laser beams for detecting the angles of the wheels. Such apparatus is able to provide correct data of angles for a calibration worker. However, the structure of the apparatus is complicated and the cost for the apparatus is relatively high. This is unbeneficial to a small-scale garage.

FIG. 2 shows a simple wheel alignment calibrator 3 in the form of claws. The calibrator 3 is mounted to the rim of a wheel to be detected to provide a calibrated detection point. Then the horizontal and vertical angles of the detection point are measured by means of a conventional measurement tool such as a level or a plumb line to calibrate the angle of the wheel.

The calibrator 3 is able to provide a calibrated detection point for a calibration worker to check the angle of the wheel by means of a conventional level or plumb line. However, in the wheel alignment process, it is necessary to steer the wheel to a specific angle, for example, when calibrating the toe-out on turn of the wheel. In such process, the calibration worker needs a proper tool to check the steering angles of the inner steering wheel and outer steering wheel. The conventional technique fails to provide any steering angle sensing device, which can be used in cooperation with the calibrator.

SUMMARY OF THE INVENTION

It is therefore a primary object of the present invention to provide a steering angle sensing device for vehicle wheel alignment includes a swingable rocking arm. The rocking arm can be located in a predetermined position and slidably connected with a simple wheel alignment calibrator. When a wheel of the vehicle is steered, the wheel alignment calibrator affixed to the wheel is synchronously rotated along with the steering of the wheel. At this time, the rocking arm is driven to swing by a corresponding angle and the steering angle sensing device emits a human-perceivable signal to a calibration worker for the calibration worker to know the steering angle of the wheel.

To achieve the above and other objects, the steering angle sensing device for vehicle wheel alignment of the present invention includes: a bed section having a pivot pin, the pivot pin having a horizontal axis; a rocking arm pivotally mounted on the pivot pin and swingable around the pivot pin within a predetermined angular swinging range; and a sensing section having at least one sensing point positioned within the swinging range of the rocking arm. The sensing point is centered at the axis of the pivot pin and angularly spaced from a gravity line by a predetermined sensing angle. The sensing section further has a sensor disposed on the rocking arm for sensing the sensing point and a signal generator for emitting a human-perceivable signal.

The present invention can be best understood through the following description and accompanying drawings, wherein:

DETAILED DESCRIPTION OF THE PREFERRED EMBODIMENTS

Figure 1:
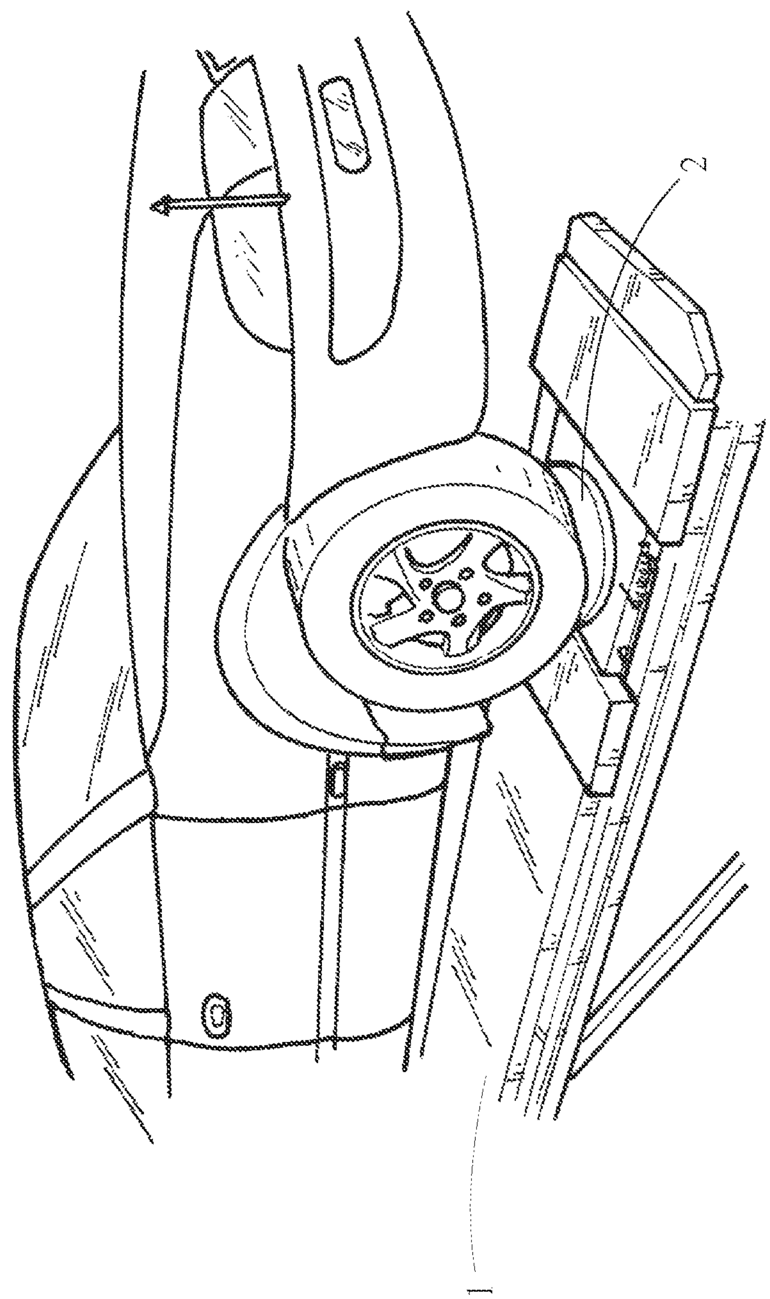
FIG. 1 is a perspective view showing that a turntable is used to align a wheel.

Please refer to FIGS. 3 to 7. According to a preferred embodiment, the steering angle sensing device 10 for vehicle wheel alignment of the present invention includes a bed section 20, a rocking arm 30 and a sensing section 40.

The bed section 20 has: a board-like base seat 21 with a certain weight; a vertical pole 22 one end of which is fixedly connected to the base seat 21; a horizontal elongated slide arm 23 normal to the vertical pole 22, one end of the slide arm 23 being formed with a through hole 231 for slidably connecting with the vertical pole 22, the slide arm 23 being adjustably securable to the vertical pole 22 at a height by means of a rotatable fastening bolt 232; a connection arm 24 downward perpendicularly extending from the other end of the slide arm 23 by certain length; a U-shaped board-like support seat 25 having an outward diverging open side and a bottom board 251, an inner face of the bottom board 251 being fixedly connected to a bottom end of the connection arm 24; and a pivot pin 26 disposed on an end face of the other end of the slide arm 23, an axis of the pivot pin 26 being parallel to the length of the slide arm 23. The support seat 25 has two lateral boards 252, 253 defining the open side of the support seat 25. The inner faces of the lateral boards 252, 253 are directed to the pivot pin 26. The lateral boards 252, 253 are mirror-symmetrical to each other with respect to a gravity line passing through the axis of the pivot pin 26.

The rocking arm 30 is pivotally mounted on the pivot pin 26 and swingable around the pivot pin 26 within an angular swinging range. The rocking arm 30 has an elongated arm body 31 pivotally mounted on the pivot pin 26. One end of the rocking arm 30 extends into the open side of the support seat 25 and is directed to the inner face of the bottom board 251 and spaced therefrom by a certain distance. The other end of the arm body 32 is formed with a slide slot 32. The slide slot 32 extends along the length of the arm body 32 by a certain length.

The sensing section 40 has a receiving box 41 fixedly disposed on one side of one end of the arm body 31 in adjacency to the inner face of the support seat 25. A sensor formed of a reed switch (not shown) is received in the receiving box 41 and has a sensing end on an end face of a bottom end of the receiving box 41. An external magnetic force is applied to the sensor to control on/off state of a circuit. A signal generator 42 formed of a buzzer is receiving in the receiving box 41 to output audio signal or stop outputting audio signal in response to the on/off state of the circuit controlled by the sensor. Two sensing points 43, 44 formed of magnetic irons are respectively disposed on inner faces of the lateral boards 252, 253 of the support seat 25 and positioned within the swinging range of the rocking arm 30. To speak more specifically, the sensing points 43, 44 are centered at the axis of the pivot pin 26 and respectively angularly spaced from the gravity line by a sensing angle $\alpha$ of 45 degrees. The operation principle and the components of the sensing section 40 pertain to prior art and thus will not be detailedly described hereinafter.

Figure 2:
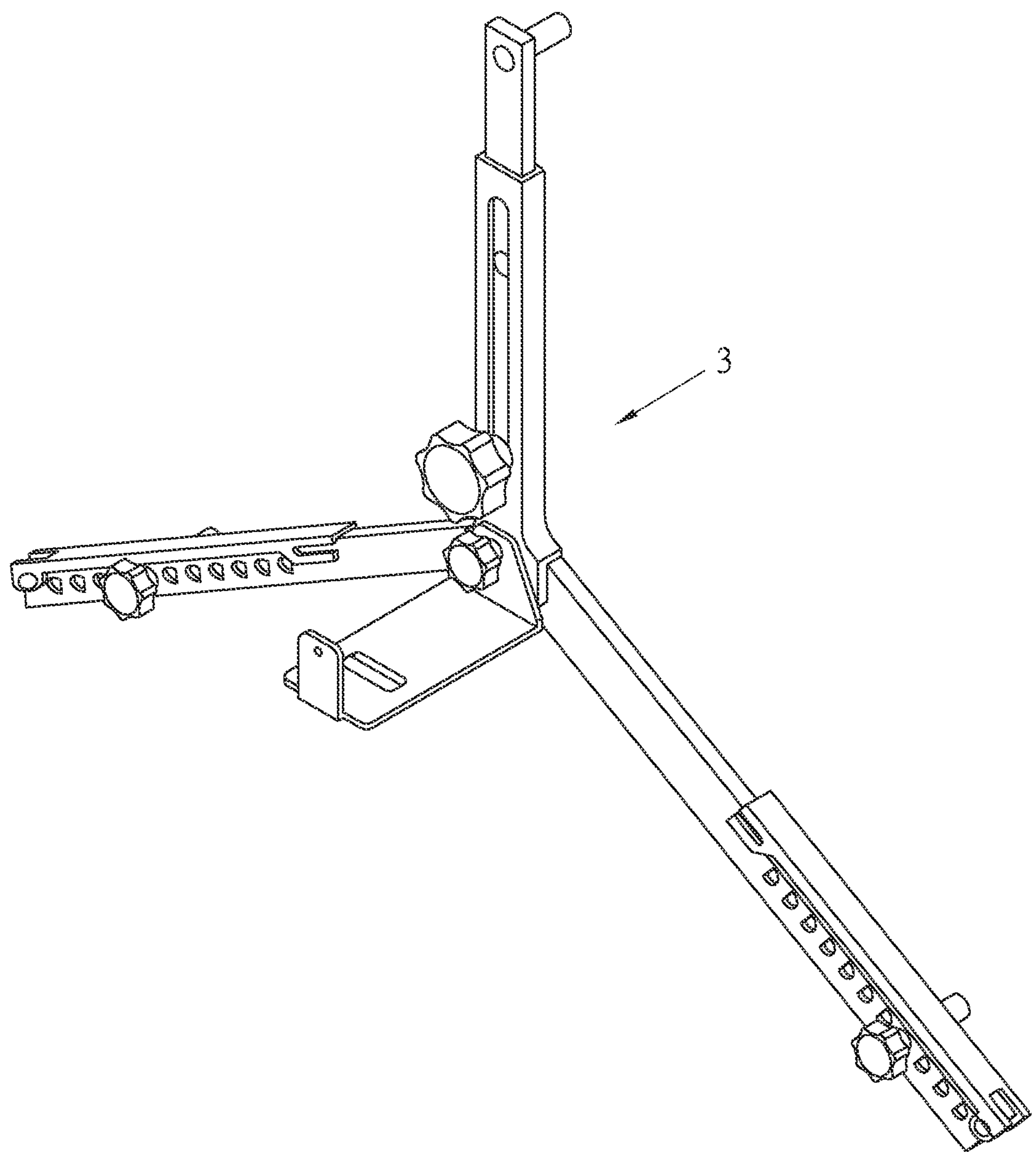
FIG. 2 is a perspective view of a conventional simple wheel alignment calibrator.
Figure 3:
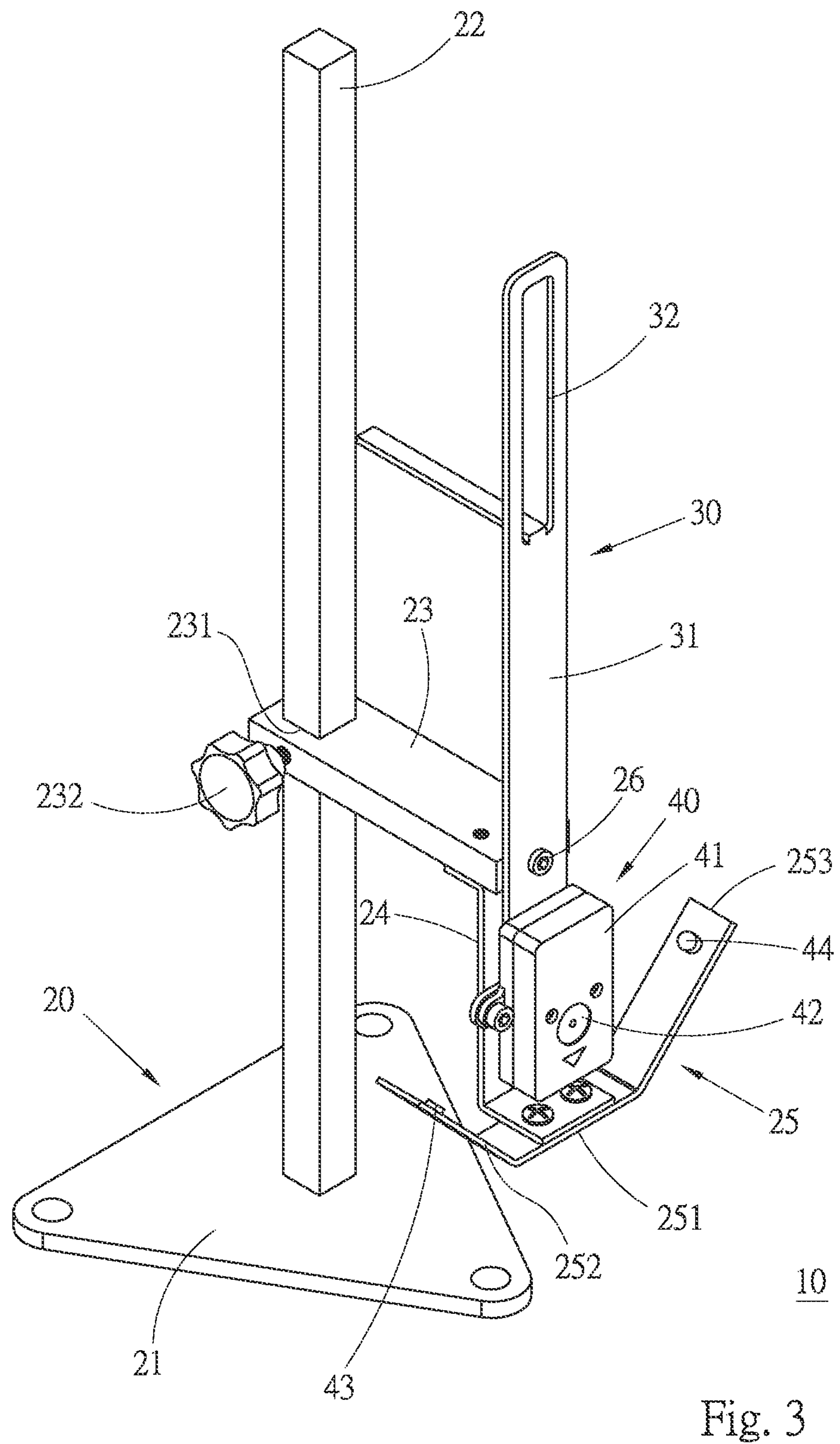
FIG. 3 is a perspective assembled view of a preferred embodiment of the present invention.
Figure 4:
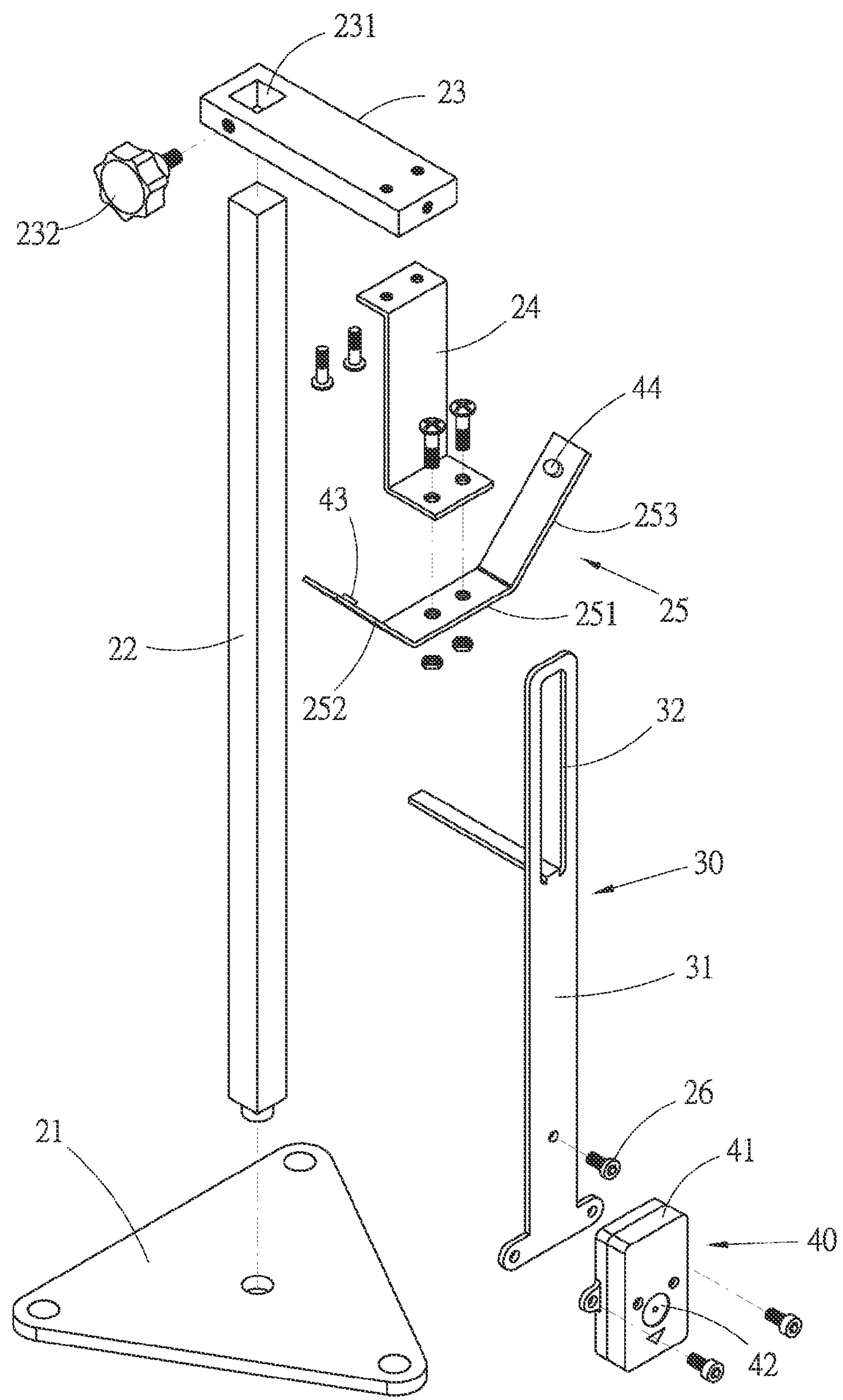
FIG. 4 is a perspective exploded view of the preferred embodiment of the present invention.
Figure 5:
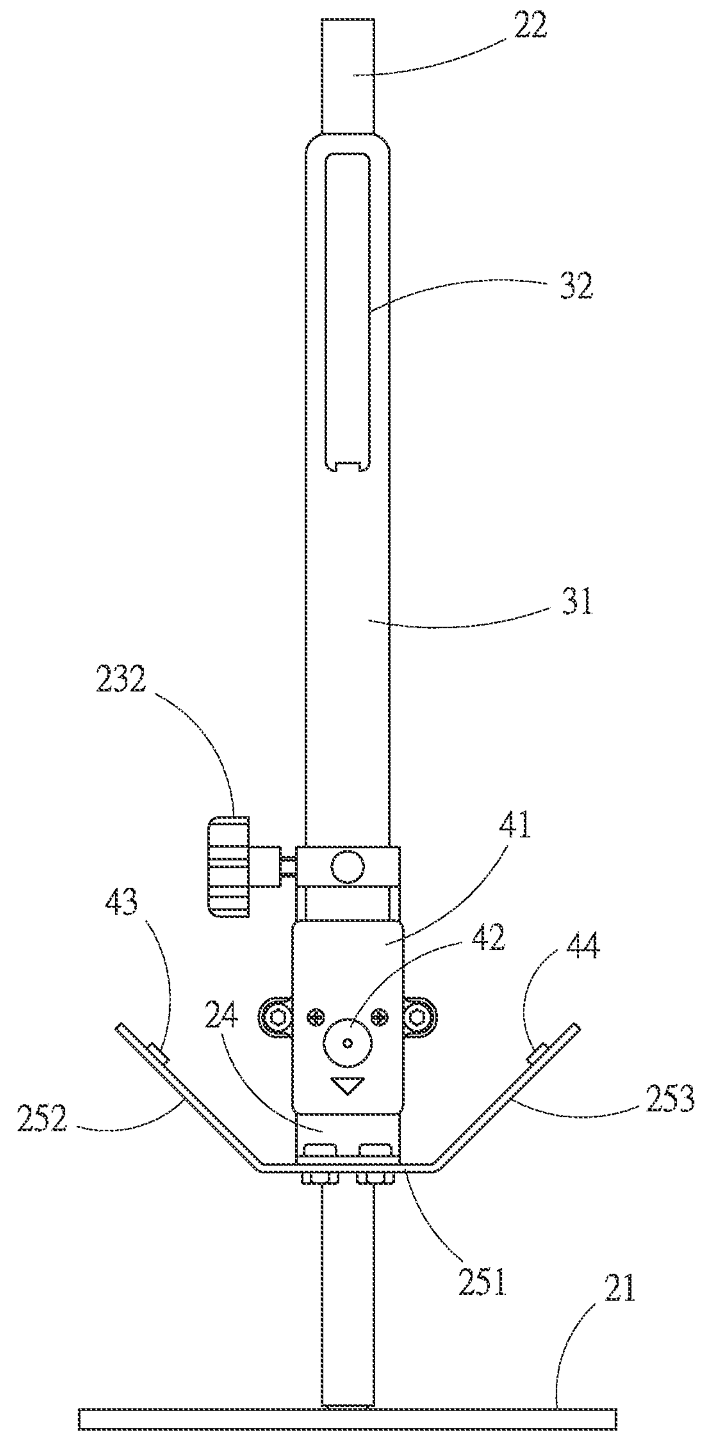
FIG. 5 is a right view of the preferred embodiment of the present invention, in which the rocking arm is parallel to a gravity line.
Figure 7:
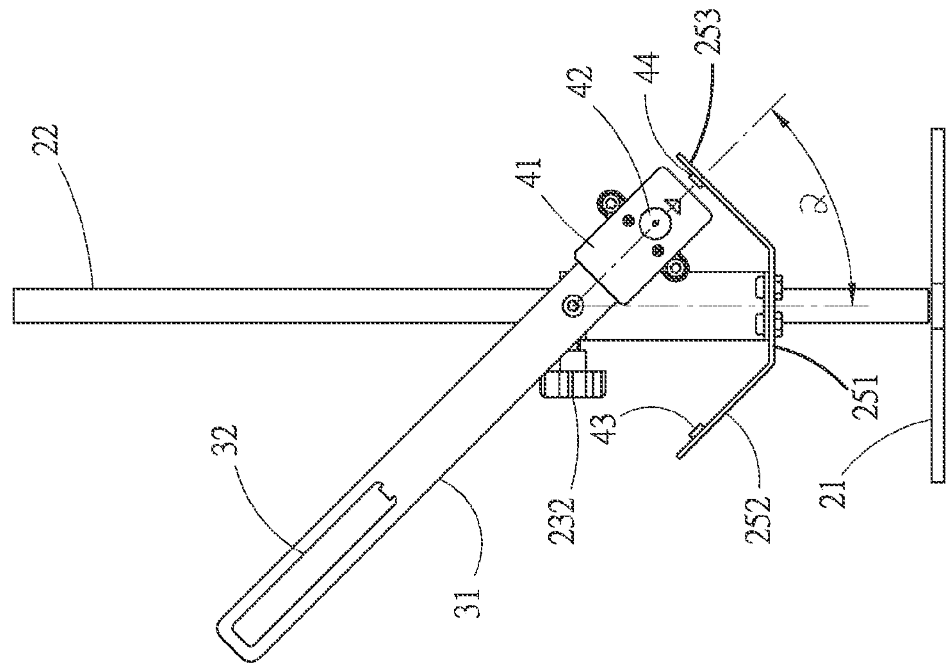
FIG. 7 is a right view of the preferred embodiment of the present invention, in which the rocking arm is swung by an angle equal to the sensing angle, whereby the sensor is lined up with the other of the sensing points.
Figure 6:
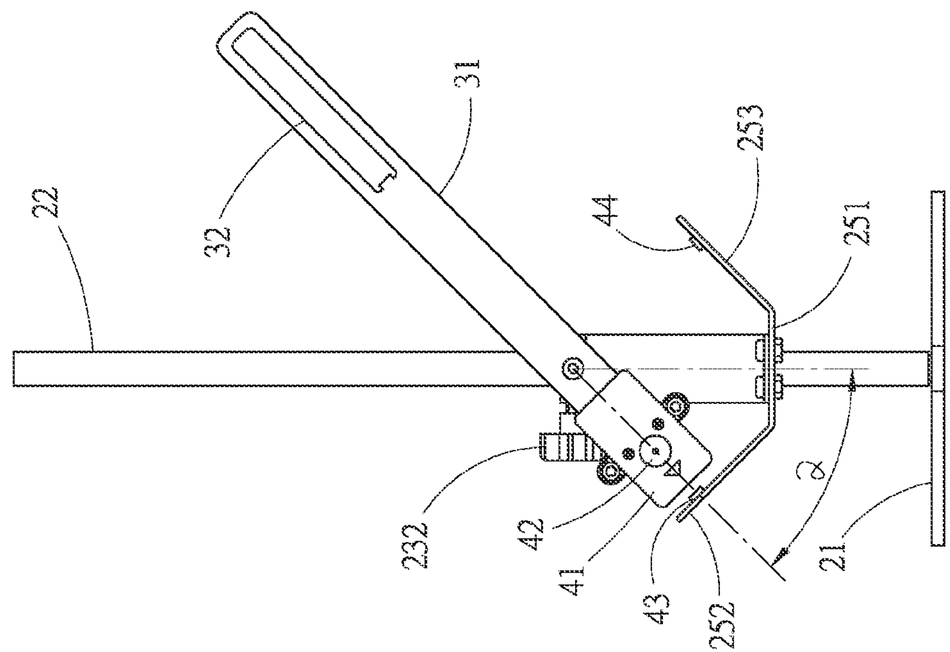
FIG. 6 is a right view of the preferred embodiment of the present invention, in which the rocking arm is swung by an angle equal to the sensing angle, whereby the sensor is lined up with one of the sensing points.
Figure 8:
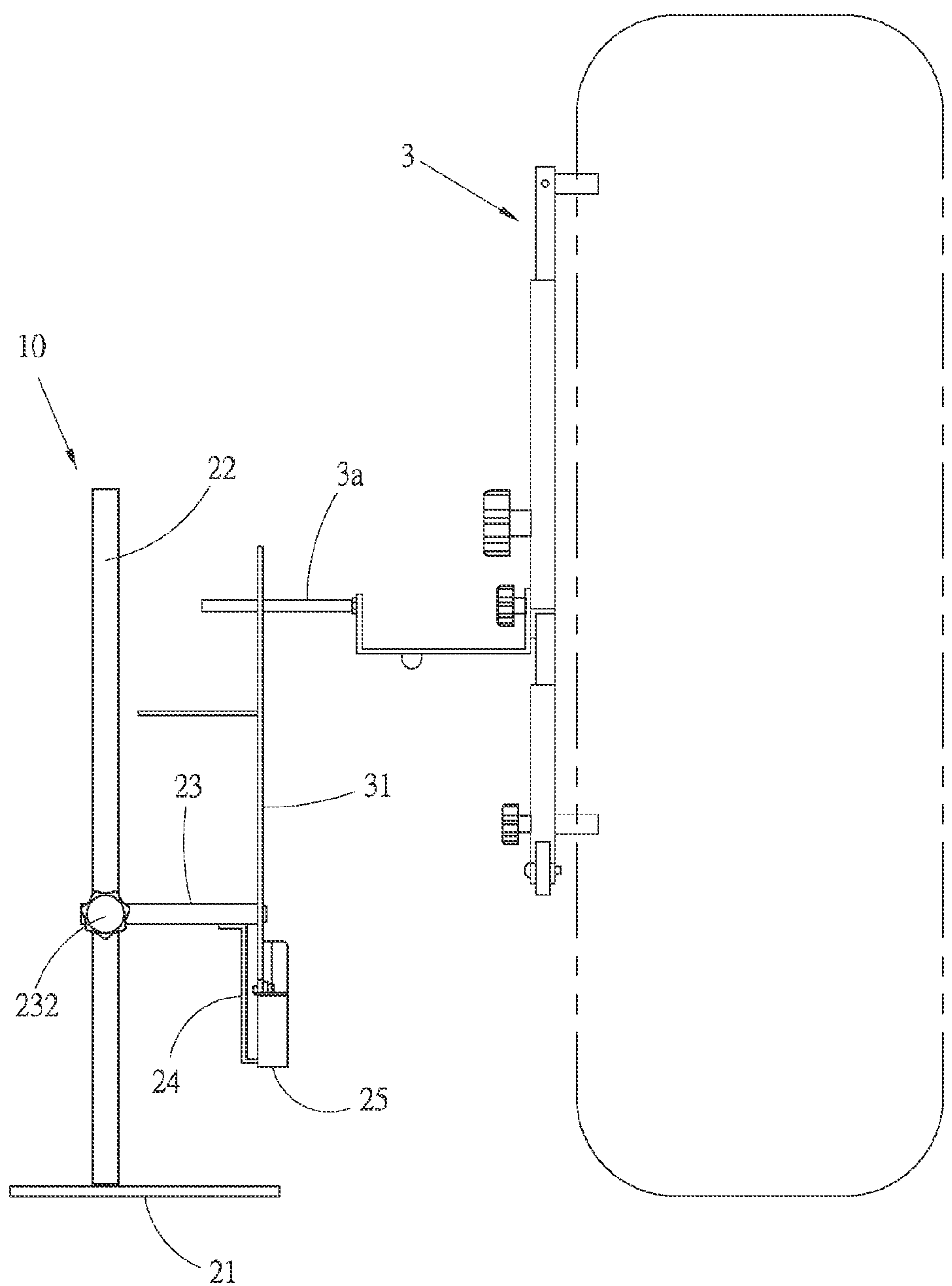
FIG. 8 is a front view of the preferred embodiment of the present invention in use.
Figure 9:
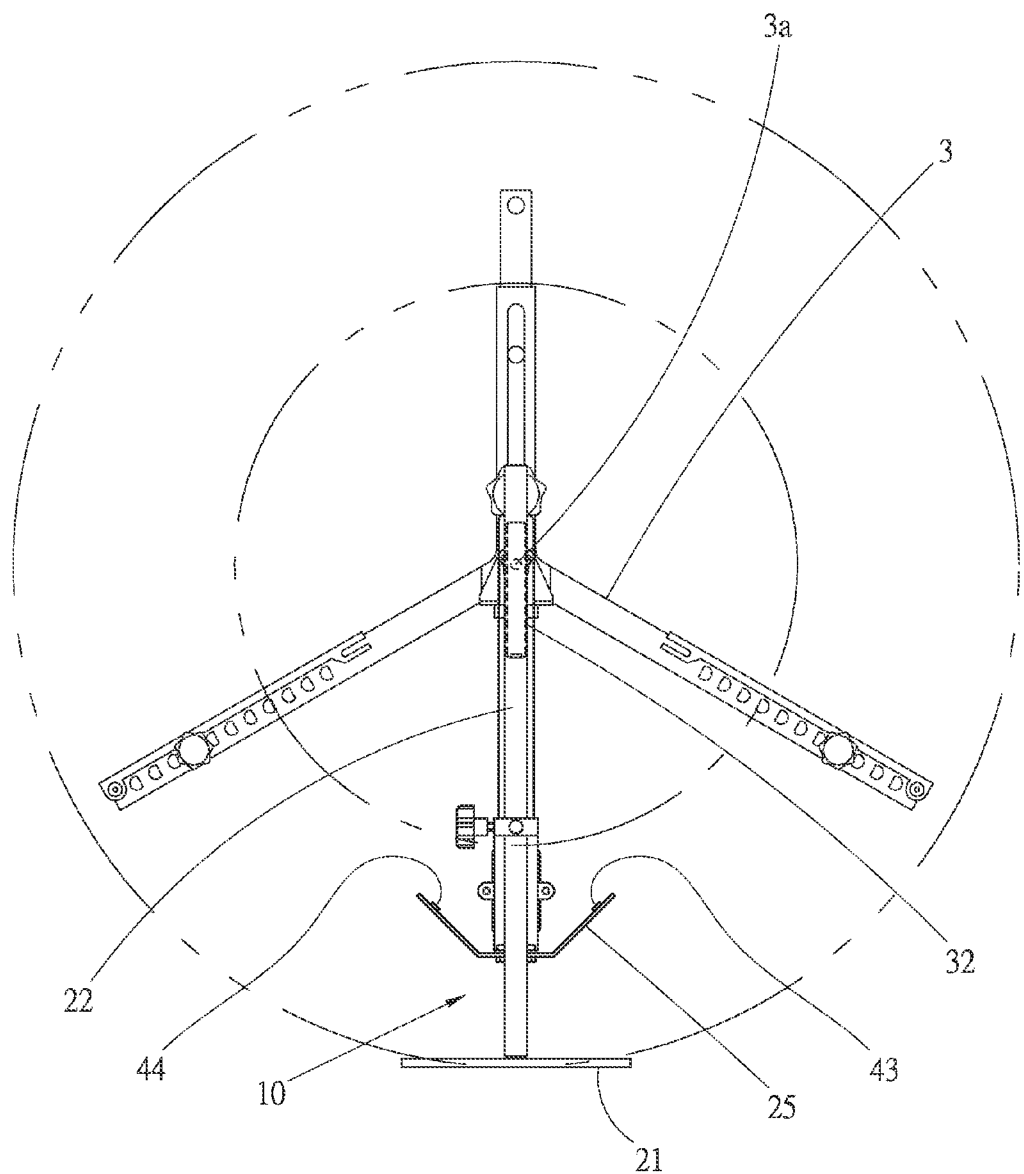
FIG. 9 is a left view of the preferred embodiment of the present invention in use.
Figure 10:
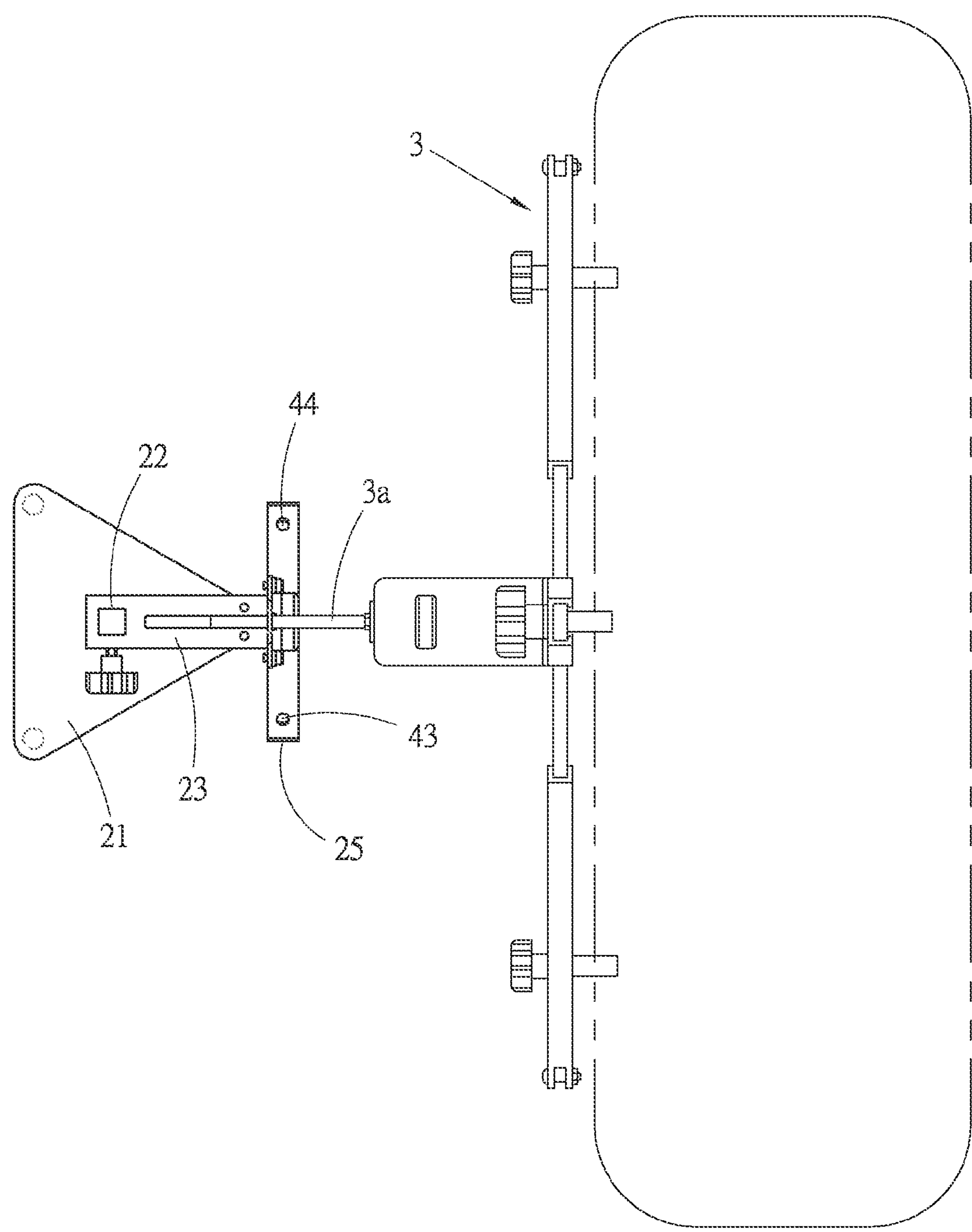
FIG. 10 is a top view of the preferred embodiment of the present invention in use.
Figure 12:
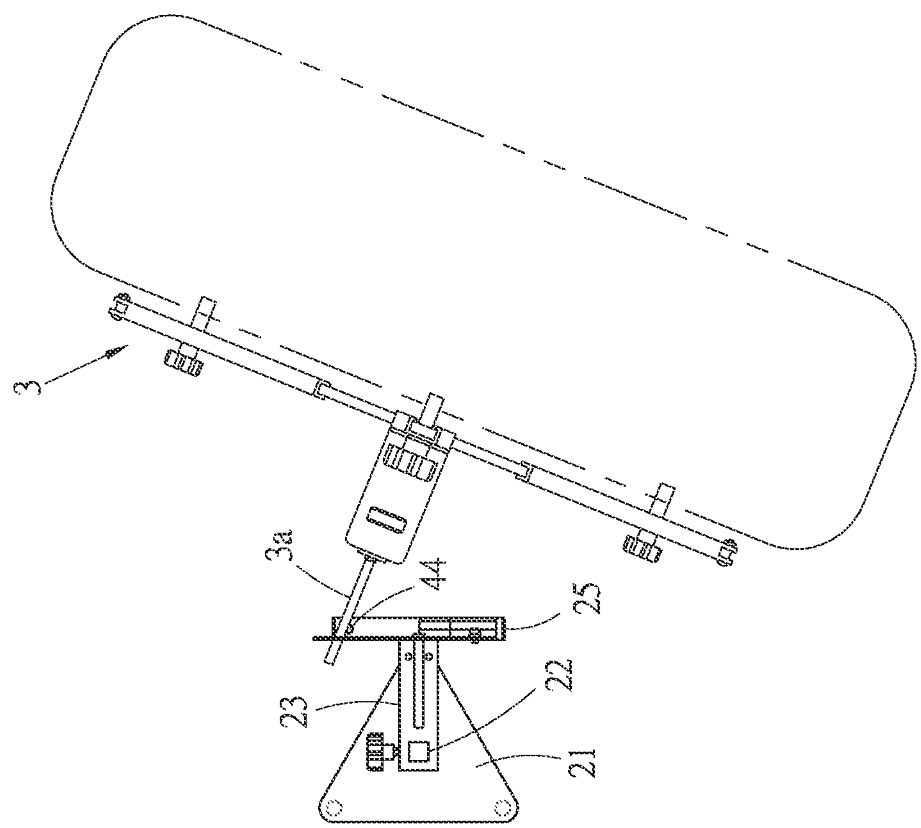
FIG. 12 is a top view of the preferred embodiment of the present invention in use, showing that the wheel is steered right.
Figure 11:
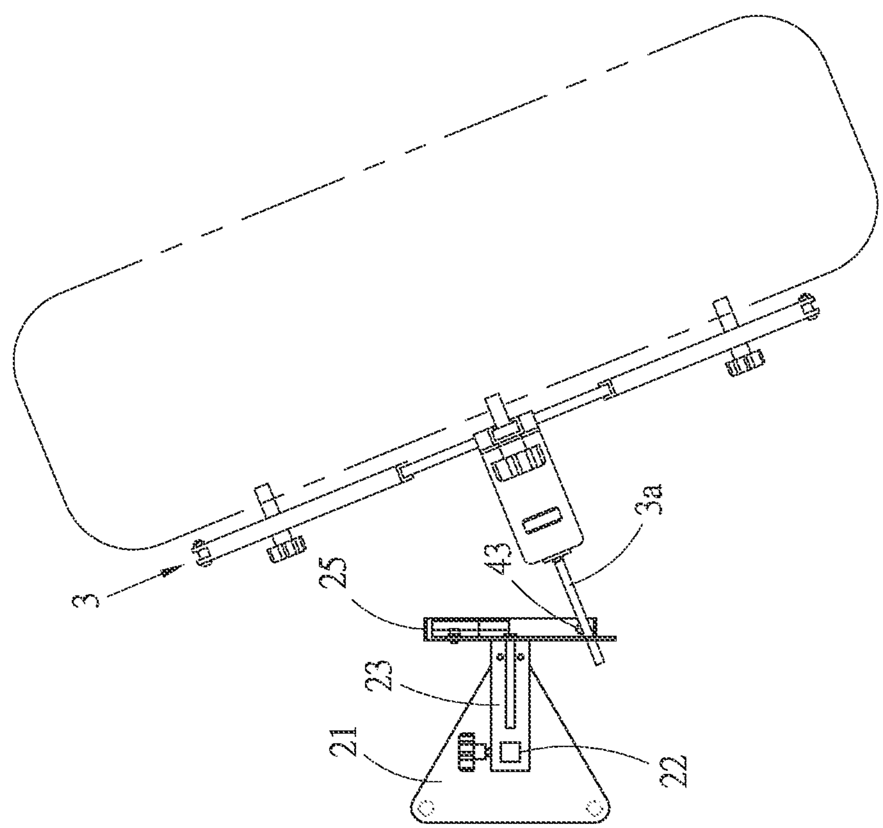
FIG. 11 is a top view of the preferred embodiment of the present invention in use, showing that the wheel is steered left.

The steering angle sensing device 10 for vehicle wheel alignment of the present invention is used in cooperation with the conventional simple wheel alignment calibrator 3 as shown in FIG. 2. Especially, an extension rod 3*a* extends from the curvature center of the wheel alignment calibrator 3. The extension rod 3*a* serves to extend into the slide slot 32 of the rocking arm 30.

Please further refer to FIGS. 8 to 12. When the steering angle sensing device 10 for vehicle wheel alignment of the present invention is co-used with the wheel alignment calibrator 3, the wheel alignment calibrator 3 is operated and located on the rim of the wheel in a conventional manner. The base seat 21 of the steering angle sensing device 10 is positioned in a fixed position beside the wheel to provide a secure gravity center with the extension rod 3*a* slidably connected in the slide slot 32. Accordingly, when a calibration worker steers the wheel, the extension rod 3*a* synchronously drives the rocking arm 30 to swing by the same angle. The sensing section 40 serves to provide a human-perceivable signal for the calibration worker to judge the steering angle of the wheel.

To speak more specifically, the human-perceivable signal provided by the sensing section 40 is an audio signal generated by the signal generator 42. When the sensor moves into the magnetic loop of one sensing point along with the swing of the rocking arm 30, under the magnetic force, the circuit is closed to activate the signal generator 42 to generate the audio signal. At this time, the calibration worker is aware of that the wheel has been steered by an angle approximate to a specific steering angle, but not yet reached the true angle. Only when the sensor and the sensing point are lined up, under the magnetic force, the sensor will open the circuit to make the signal generator 42 stop generating the audio signal. At this time, the sound disappears to mean that the wheel has been steered and positioned in a specific angular position. In the case that the calibration worker further steers the wheel over the specific angular position, the sensor is moved far away from a position where the sensor opens the circuit. Under such circumstance, the signal generator 42 generates the audio signal again for the calibration worker to know that the wheel has been over-steered.

Through the generation/disappearance of the audio signal of the steering angle sensing device 10 for vehicle wheel alignment of the present invention, when sitting on a driver seat to steer the wheel, a calibration worker can synchronously judge whether the wheel is truly steered. The operation of the steering angle sensing device 10 is very easy and the structure of the steering angle sensing device 10 is simplified. In comparison with the conventional technique, the cost for the steering angle sensing device 10 is lower so that the wheel alignment process can be popularized.

It should be noted that the above embodiment is only used to illustrate the present invention, not intended to limit the scope thereof. Many modifications of the above embodiment can be made without departing from the spirit of the present invention. For example, the components of the sensing section can be replaced with equivalents. Also, the movable bed section with the base seat can be replaced with a stationary base seat-free bed section. Also, the shape of the rocking arm can be changed and the sensing section and the slide slot can be positioned on two sides of the pivot pin or on the same side of the pivot pin.

What is claimed is:

1. A steering angle sensing device for vehicle wheel alignment, comprising:

a bed section having a pivot pin, the pivot pin having a horizontal axis;

a rocking arm pivotally mounted on the pivot pin and swingable around the pivot pin within a predetermined angular swinging range; and a sensing section having at least one sensing point positioned within the swinging range of the rocking arm, the sensing point being centered at the axis of the pivot pin and angularly spaced from a gravity line by a predetermined sensing angle, the sensing section further having a sensor disposed on the rocking arm for sensing the sensing point and a signal generator for emitting a human-perceivable signal;

wherein the bed section further has a vertical pole and an elongated slide arm, one end of the slide arm being perpendicularly slidably connected to the vertical pole, the pivot pin being disposed at the other end of the slide arm;

wherein the bed section further has a support seat, a lateral face of the support seat facing a sensing end of the sensor, the sensing point being disposed on the lateral face in a predetermined position;

wherein the support seat is U-shaped and has an outward diverging open side defined between two lateral boards, the sensing point being positioned on inner face of one of the lateral boards of the support seat.

2. The steering angle sensing device for vehicle wheel alignment as claimed in claim 1, wherein the axis of the pivot pin is parallel to a length of the slide arm.

3. The steering angle sensing device for vehicle wheel alignment as claimed in claim 1, wherein the bed section further has a connection arm bridged between the support seat and the other end of the slide arm.

4. The steering angle sensing device for vehicle wheel alignment as claimed in claim 1, wherein the sensing angle is an angle of 45 degrees.

5. The steering angle sensing device for vehicle wheel alignment as claimed in claim 1, wherein the sensing points are angularly spaced from the gravity line by the same sensing angle.

6. A steering angle sensing device for vehicle wheel alignment, comprising:

a bed section having a pivot pin, the pivot pin having a horizontal axis;

a rocking arm pivotally mounted on the pivot pin and swingable around the pivot pin within a predetermined angular swinging range; and a sensing section having at least one sensing point positioned within the swinging range of the rocking arm, the sensing point being centered at the axis of the pivot pin and angularly spaced from a gravity line by a predetermined sensing angle, the sensing section further having a sensor disposed on the rocking arm for sensing the sensing point and a signal generator for emitting a human-perceivable signal;

wherein the rocking arm has an elongated arm body formed with a slide slot, the slide slot extending along a length of the arm body by a predetermined length.

7. The steering angle sensing device for vehicle wheel alignment as claimed in claim 6, wherein the slide slot and the sensor are respectively positioned at two ends of the arm body with the pivot pin positioned between the slide slot and the sensor.

8. The steering angle sensing device for vehicle wheel alignment as claimed in claim 6, wherein the axis of the pivot pin is parallel to a length of the slide arm.

9. The steering angle sensing device for vehicle wheel alignment as claimed in claim 6, wherein the sensing angle is an angle of 45 degrees.

10. The steering angle sensing device for vehicle wheel alignment as claimed in claim 6, wherein the sensing points are angularly spaced from the gravity line by the same sensing angle.

11. A steering angle sensing device for vehicle wheel alignment, comprising:

a bed section having a pivot pin, the pivot pin having a horizontal axis;

a rocking arm pivotally mounted on the pivot pin and swingable around the pivot pin within a predetermined angular swinging range; and a sensing section having at least one sensing point positioned within the swinging range of the rocking arm, the sensing point being centered at the axis of the pivot pin and angularly spaced from a gravity line by a predetermined sensing angle, the sensing section further having a sensor disposed on the rocking arm for sensing the sensing point and a signal generator for emitting a human-perceivable signal;

wherein the sensing point is a magnetic iron, the sensor is a reed switch and the signal generator is a buzzer.

12. The steering angle sensing device for vehicle wheel alignment as claimed in claim 11, wherein the signal generated by the signal generator is an audio signal, when the sensor is positioned in the magnetic loop of the sensing point, the signal generator generating the audio signal, when the sensor is lined up with the sensing point, the signal generator stopping generating the audio signal.

13. The steering angle sensing device for vehicle wheel alignment as claimed in claim 11, wherein the sensing section has two sensing points, the sensing points being centered at the axis of the pivot pin and positioned on two sides of the gravity line.

14. The steering angle sensing device for vehicle wheel alignment as claimed in claim 11 wherein the axis of the pivot pin is parallel to a length of the slide arm.

15. The steering angle sensing device for vehicle wheel alignment as claimed in claim 11, wherein the sensing angle is an angle of 45 degrees.

16. The steering angle sensing device for vehicle wheel alignment as claimed in claim 11, wherein the sensing points are angularly spaced from the gravity line by the same sensing angle.

* * * * *